Figure 1:
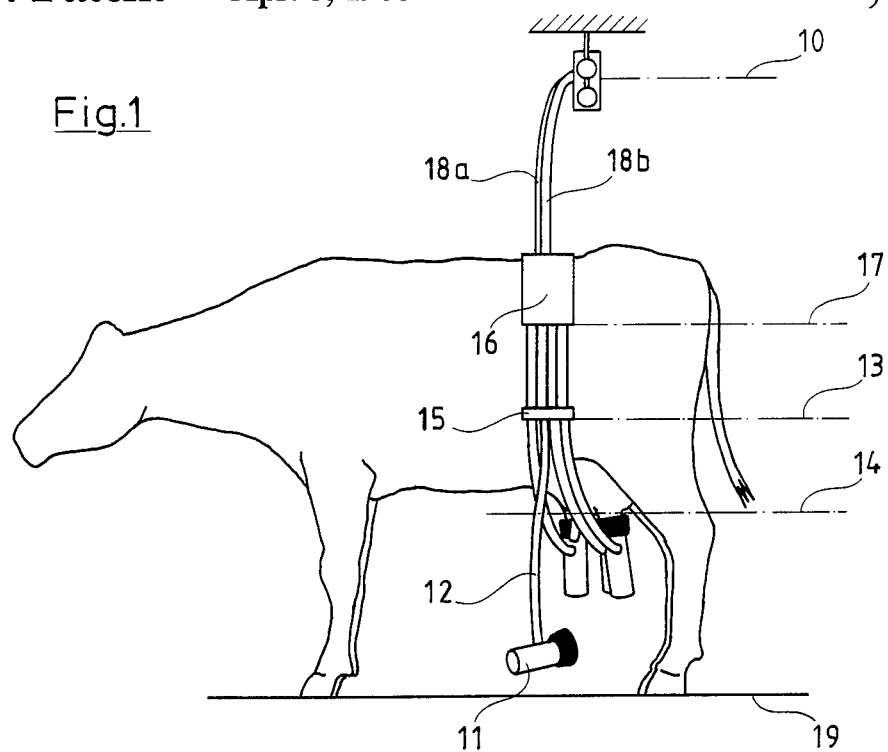

United States Patent [19]
Wahlström et al.

[11] Patent Number: 4,735,172
[45] Date of Patent: Apr. 5, 1988

[54] MILKING MEANS

[75] Inventors: Lennart Wahlström, Tumba; Michael Mayntz, Hölö, both of Sweden

[73] Assignee: Alfa-Laval Agri International AB, Sweden

[21] Appl. No.: 777,784

[22] PCT Filed: Feb. 6, 1985

[86] PCT No.: PCT/SE85/00058
§ 371 Date: Sep. 18, 1985
§ 102(e) Date: Sep. 18, 1985

[87] PCT Pub. No.: WO85/03410
PCT Pub. Date: Aug. 15, 1985

[30] Foreign Application Priority Data
Feb. 10, 1984 [SE] Sweden ............... 8400704

[51] Int. Cl.$^4$ ............... A01S 9/08
[52] U.S. Cl. ............... 119/14.1; 119/14.11; 119/14.12
[58] Field of Search ............... 119/14.1, 14.11, 14.12, 119/14.13

[56] References Cited
U.S. PATENT DOCUMENTS

| | | | |
|---|---|---|---|
| 994,956 | 6/1911 | Sharples | 119/14.1 |
| 2,982,247 | 5/1961 | Varese et al. | 119/14.11 |
| 3,094,099 | 6/1963 | Bertao | 119/14.1 X |
| 3,818,866 | 6/1974 | Thomas | 119/14.12 |
| 3,870,021 | 3/1975 | Nederbragt | 119/14.13 |
| 3,999,516 | 12/1976 | Shulick | 119/14.1 |
| 4,047,500 | 9/1977 | Bender et al. | 119/14.11 |
| 4,586,462 | 5/1986 | Icking | 119/14.13 X |

FOREIGN PATENT DOCUMENTS 470605  1/1951  Canada ............... 119/14.1

Primary Examiner—Carl D. Friedman
Assistant Examiner—Creighton Smith
Attorney, Agent, or Firm—Cyrus S. Hapgood

[57] ABSTRACT

A milking means comprising a number of teat cups, each having necessary connections for the milking function. According to the invention the milking means has such a design that when the milking means is in the position for application of the teat cups (11; 21; 31; 40; 50) onto the teats of the animal, each teat cup freely from the remaining teat cups is hanging down from a point (13; 25; 32; 45; 54) above the teat base (14; 26; 33; 46; 55) of the udder of the animal.

9 Claims, 3 Drawing Sheets

MILKING MEANS

This invention relates to a milking means comprising a number of teat cups, each having necessary connections for the milking function.

Known milking means is normally provided with a so called milk claw which is positioned close to the teat cups and beneath these ones and which is connected to the teat cups via the milk tubes and the pulsation tubes. In this connection the length of the milk tube between the teat cup and the milk claw usually is about 15 cm.

An essential drawback with known technics is that the milker must use both his hands when applying the teat cups onto the teats. As a rule, this is done in that way that the milker holds up the milking means by holding the milk claw with one of his hands and applies the teat cup onto the teat with his other hand. In this connection both his arms are outstretched in front of his body.

This working moment has been thoroughly studied by Professor J. Ekholm et al in the Karolinska Institut. The study of Mr. Ekholm comprises the load of the motion organs of the milker. Due to the working position there arise great moments in several of the joints of the body. By always having a certain working position at each cow being milked and having the milking work each day of the year, this can lead to wear and fatique of the joint surfaces. The opinion of Ekholm is that this phenomenon can be critical and lead to or make already arisen artroses and other joint troubles worse in the neck region, loin back, hips and knees. When milking in two planes, the load on knees, hips and loin back is reduced but is rather increased in the neck and shoulders. The opinion of Ekholm that the load can be critical is proved by a high frequence of mentioned types of troubles among milkers.

Another drawback with known technics is an uneven pull difficult to control in the teats of the cow. Due to the fact that the milk tubes and pulsation tubes leading from the teat cup to the milk claw have a certain stiffness, the centre of gravity of the parts included in the system are necessarily distributed more or less unevenly on the teats. This has the consequence that the udder will mot be completely milked out which leads to a low milk production of the cow.

A third drawback is that the milk tube and normally also the pulsation tube are fastened to the teat cup in such a way that when the teat cups are hanging in their tubes from the milk claw, the teat cups are directed downwards. This has the grave disadvantage that under unfavourable circumstances the teat cup can fall down onto the floor and suck up dirty particles and other things.

The purpose of this invention is to remove the problems connected with known technics. This purpose is attained according to the invention by a milking means of the kind mentioned by way of introduction the milking means has such a design that when the milking means is in the position for application of the teat cups onto the teats of the animal, each teat cup hangs down freely from the remaining teat cups from a point above the teat base of the udder of the animal.

Due to this arrangement each of the teat cups will be freely hanging, whereby the milker does not need to lift all the teat cups inclusive the milk claw when putting on a teat cup onto the teat as has been the case when using the known technics. Instead of lifting the whole weight of the milking means distributed on this outstretched arms, the milker needs only to lift a quarter of the weight with one arm.

That means a considerable reduction of the load on the motion organs of the body according to calculations made. For the neck region the load will be reduced with about 50% and for the loin back and the hip joint the reduction of the load for one plane-milking will be about 15%.

Due to the fact that each teat carries the weight of its own teat cup with tubes but cannot be influenced by the remaining parts of the milking means, the weight of the milking means will be evenly distributed on the teats and always of equal size even on cows having only three teats.

Other things that are characteristic for the invention will appear from the following description of the invention with reference to the accompanying drawings, in which FIGS. 1–5 show five different embodiments of the milking means, preferably for milking cows, and FIGS. 6–10 show five different embodiments of the teat cup which can be used in the milking means according to FIGS. 1–5.

Referring now to FIG. 1 there is shown a milking means connected to the milking system in a point on a level 10, preferably straightly above the udder of the cow. The milking means comprises four teat cups 11 with tubes 12, each teat cup 11 hanging in its own tubes 12 freely from the remaining teat cups from a point on a level 13 which is positioned above the level 14 for the teat base of the udder of the cow. The point on the level 13 can be a mechanical collecting point for the tubes or a collecting point for the flow streaming in the tubes. This collecting point can be arranged between the level 14 for the teat base of the cow and the level 10 for the point, where the milking means is connected with the central lines for vacuum and milk, normally seen. The mechanical collecting point can be a collecting means 15, where the tubes for vacuum and milk from the teat cups are brought together. Such a collecting means can be upwards or downwards displaced, whereby the level 13 for the collecting point is changed.

A collecting point for the flow can be a device 16, where the tubes from the teat cups are brought together. This collecting point, as has been mentioned previously, can be positioned on the level 10 but is usual on a lower level 17. In this later case a single milk line 18a and a single vacuum line 18b lead from the device 16 on the level 17 to the central lines for milk and vacuum on the level 10. Thus, according to the FIG. 1 there are two collecting points for the tubes, one on level 13 and the other on the level 17. It is, however, not necessary to have two collecting points for the tubes, but only one could be sufficient.

Since it is usually so that there is one milk tube and one pulsation tube leading to each teat cup, the reference number 12 includes both tubes.

In an inactive situation the teat cups are positioned beside the cow and beneath the udder of the cow. In this connection the length of the tubes is such and the connection between the tubes and the teat cups is such that the teat cups will be hanging in their tubes essentially horizontally above but rather near the floor 19 of the cow compartment, whereby there is no risk that the teat cups shall suck up dirty particles and other things from the floor 19 of the cow compartment.

Thanks to the mentioned arrangement of the tubes and the teat cups it will be very easy to apply the teat cups on the teat. Thus, each teat cup can be applied onto the teat by a simple hand grip. That means that the milker can apply two teat cups on the teats simultaneously.

Figure 2:
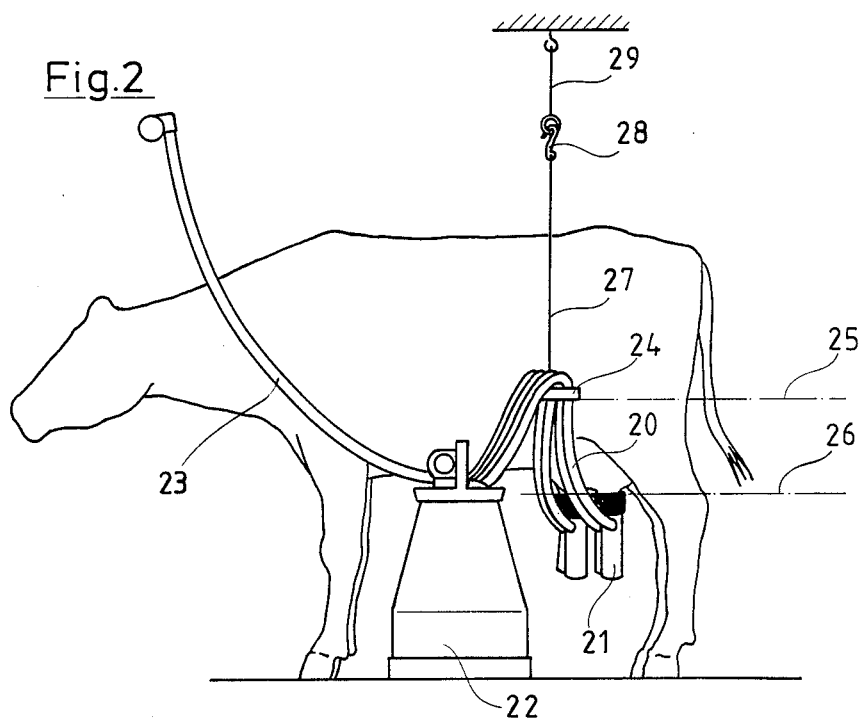

In FIG. 2 there is shown another embodiment of the invention. The tubes 20 from the teat cups 21 lead to a bucket 22 which is connected with a vacuum line via the tube 23. The tubes 20 are assembled in a collecting means 24 on a level 25 above the level 26 for the teat base of the udder of the cow. The collecting means 24 is held in position beside and close to the cow by means of a band, wire or a similar thing 27, one end of which is fastened to the collecting means and the other end of which is fastened to a hook 28 which cooperates with a wire 29 hanging down from the roof of the cow compartment.

Figure 3:
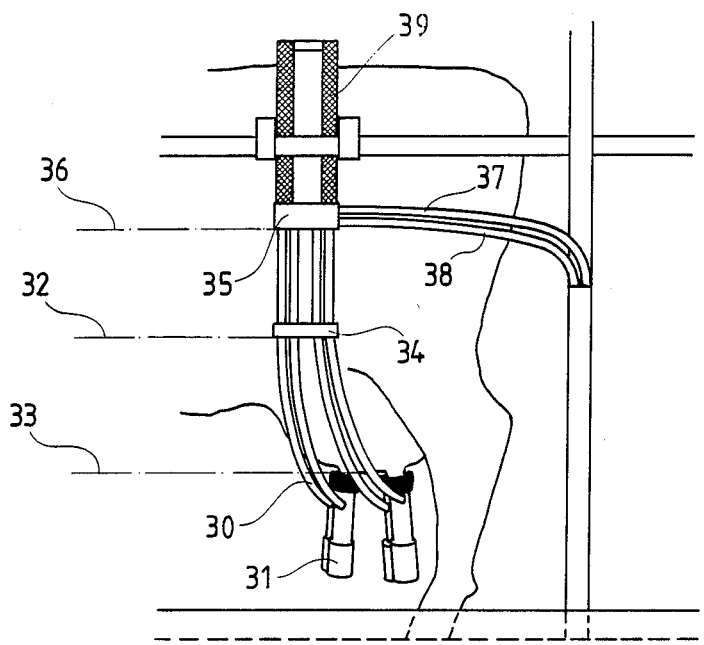

In FIG. 3 there is shown a third embodiment of the invention. This embodiment has certain similarities with that according to FIG. 1. Thus, the milk and pulsation tubes 30 from the teat cups 31 are brought together at a first collecting point on a level 32 above the level 33 of the teat base of the cow by a collecting means 34. From this collecting means 34 all tubes are extending to a second collecting point for the flow in the form of a collecting device 35 on a level 36 above a level 32. From this collecting device 35 there lead a single milk tube 37 and a single vacuum tube 38 to the central lines of the milking system.

The level 36 of the collecting device 35 and accordingly the distance between the teat cups in non-operative position and the floor of the cow compartment can be changed by adjusting the device 39, to which the collecting device 35 is fastened, upwards or downwards.

Figure 4:
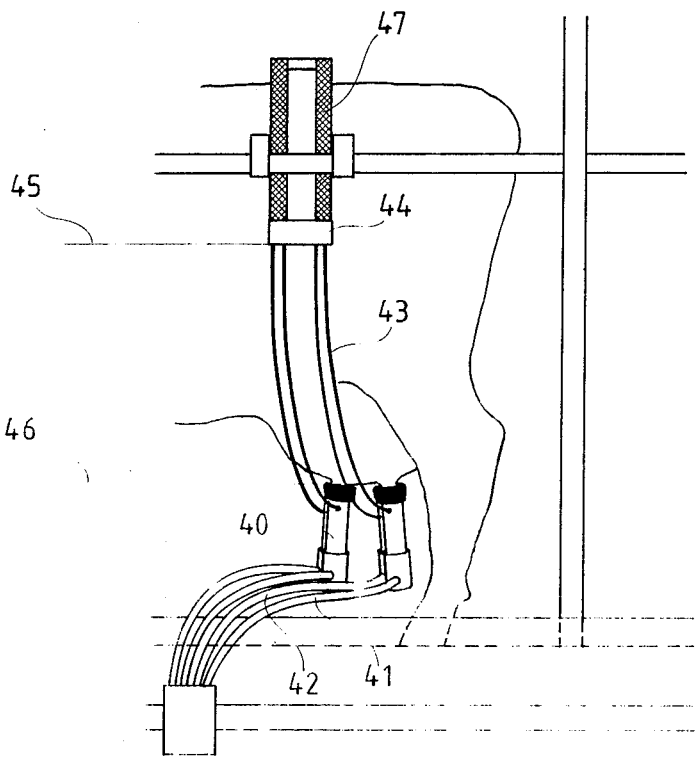

In FIG. 4 there is shown a fourth embodiment of the invention. This embodiment has the teat cups 40 provided with connections at their lower parts for one end of the milk tube 41 and the pulsation tube 42. The other ends of the tubes are connected to the central milk line and the central vacuum line under the floor of the cow compartment.

In non-operative situation the teat cups are held in position for application onto the teats by means of wires 43, one end of which is fastened to the teat cups and the other end of which is fastened to a collecting means 44, positioned on a level 45 above the level 46 of the teat base of the cow. The means 44 is fastened to a device 47 with which the level 45 of the collecting means and accordingly the position of the teat cups 40 in non-operative situation can be adjusted upwards or downwards.

Figure 5:
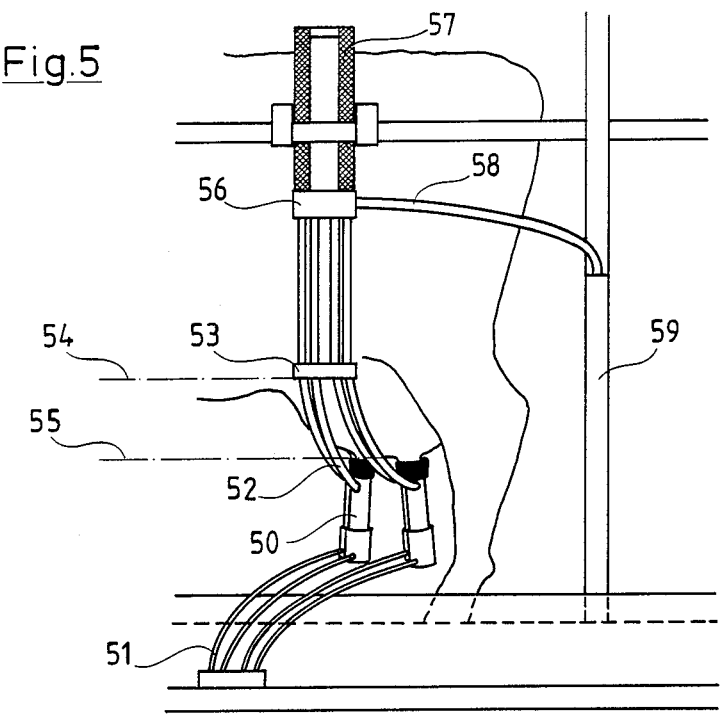

In FIG. 5 there is shown a modification of the embodiment according to FIG. 4. Thus, FIG. 5 shows teat cups 50 with milk tubes 51 fastened to the teat cups at the lower parts of the same and bringing the milk from the teat cups to the central milk line under the floor of the cow compartment. The pulsation tubes 52 are fastened to the teat cups on such a level that during non-operative situation the teat cups can be hanging in the tubes 52 in an essentially horizontal position. The pulsation tubes 52 are extending upwards from the teat cups 50 and are assembled by a collecting means 53 positioned on a level 54 above that 55 of the teat base of the cow. The tubes 52 are extending upwards from the collecting means 53 to another collecting device 56 fastened to a device 57 which is vertically adjustable. From the collecting device 56 there is only one vacuum line 58 leading in a chute 59 to the central vacuum line under the floor of the cow department.

The collecting means described in the text which can be displaced along the tubes is suitably a piece of plastics material provided with a hole for each tube going through the piece.

Common for all five embodiments of the milking means is that when the teat cups are in position for application onto the teats of the cow, the teat cups are hanging beside the cow and are in an essentially horizontal position above and rather close to the floor of the cow compartment so that with a simple hand grip each teat cup can be applied onto the teats of the cow.

Referring now to FIGS. 6–10 there are shown there different embodiments of the teat cups which are to be used in the milking means according to FIGS. 1–5. Thus, in FIG. 6 there is shown a teat cup 60 comprising a casing inside which is attached a teat cup liner and which casing is connected with a pulsation tube 61 and a milk tube 62. In this connection the pulsation tube 61 is connected to the teat cup casing on a tubular nipple 63 in a point in or near the centre of gravity of the teat cup, while the milk tube 62 is fastened onto a tubular nipple 64 which is perpendicularly attached to the teat cup 60. In this connection the milk tube 62 is arranged in that way that it has its own extension from the teat cup and joins the pulsation tube in a point P at a certain distance from the teat cup, from which point the tubes extend together. The pulsation tube 61 is given a length which is essentially less than that of the milk tube 62. Due to that arrangement and the fact that the pulsation tube is applied to a point in or near the centre of gravity of the teat cup, the teat cup is held in an essentially horizontal position even since it has been taken off from the teat. In this way the risk is eliminated that the teat cup head shall be directed towards the floor and be able to suck up dust particles and dirty particles into the milk line.

Figure 6:
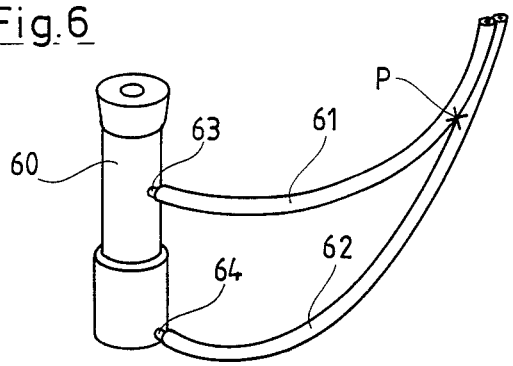
Figure 7:
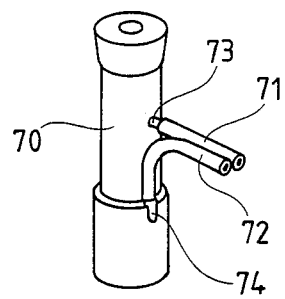

In FIG. 7 there is shown another embodiment of the invention which differs from that according to FIG. 6 in that way that the milk tube 72 is extending along the outside of the teat cup wall up to the connecting place of the pulsation tube 71, wherefrom the two tubes extend together. In this connection, as in the embodiment according to FIG. 6 the pulsation tube 71 is applied onto a nipple 73 which is perpendicularly attached to the teat cup casing 70. The milk tube 72, however, is attached onto a tubular nipple 74 which is applied to the teat cup 70 in the lower part of the same and extends essentially parallel with the longitudinal direction of the teat cup.

Figure 8:
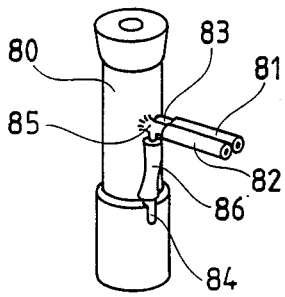
Figure 9:
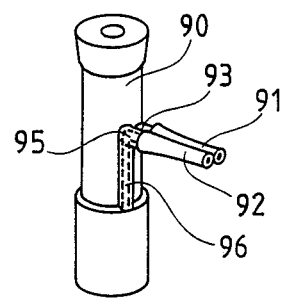

In FIGS. 8 and 9 there are shown modifications of the device according to FIG. 7. Thus, in these ones is shown a tubular nipple 83; 93 for the pulsation tube 81; 91, which nipple is fastened to the teat cup casing 80; 90 in the same way as in FIGS. 6 and 7. The connection of the milk tube 82; 92 to the teat cup casing 80; 90, however, differs from that according to FIGS. 8 and 9.

According to FIG. 8 the milk tube 82 is fastened onto a nipple 85 which consists of an angular pipe applied to the outer wall of the teat cup casing 80. Furthermore, another tubular nipple 84 is fastened to the lower part of the teat cup in the same way as in FIG. 7. Between the nipples 84 and 85 there is applied a tube 86 connecting these two nipples.

In FIG. 9 the milk tube 92 is connected to a nipple 95 being an integral part of a pipe 96 which is applied onto the outside of the teat cup casing 90. Instead of being an integral part of the pipe 96, the nipple 95 can be a separate part fastened to the pipe 96. The pipe 96 has connection with the inner part of the teat cup liner and accordingly can conduct milk from the teat cup to the milk tube 92. The pipe 96 can either be an integral part of the teat cup 90 of a separate part fastened to the teat cup along its length. The nipple 95 onto which the milk tube is fastened is preferably positioned on the teat cup casing on thee same level as the nipple 93 for the pulsation tube 91 and close to same. This has the consequence that the pulsation tube 91 and the milk tube 92 can be put close to each other and get a common extension from the teat cup 90. This fact plus the fact that the milk line at the teat cup consists of a pipe 96 extending along the teat cup wall has the consequence that the teat cup according to FIG. 9 is very robust, compact and easy to handle.

Another possible embodiment is that the milk line at the teat cup, i.e. that part of the line which is positioned between the teat cup liner and the nipple for the milk tube, which nipple has the same position as in FIGS. 8 and 9 is positioned inside the teat cup casing.

Figure 10:
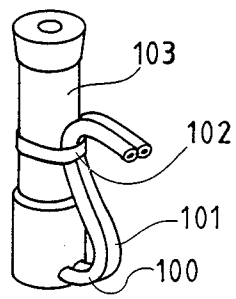

In FIG. 10 there is shown the last embodiment of the teat cup. Both the milk tube 100 and the pulsation tube 101 is fastened to the lower part of the teat cup, i.e. essentially below the centre of gravity. In order to be able to have the teat cup in an essentially horizontal position when hanging in the position for application onto the teat, the teat cup must hang essentially at the centre of the gravity. For making that possible the teat cup is provided with a band 102 which extends round the teat cup body 103 and the two tubes 100, 101.

The advantage with this embodiment and the previously described embodiments of the teat cup is that they are very simple to handle. Thus, since the connection between the milk and pulsation tubes and the teat cup is about at the centre of the gravity the result will be that the teat cups will be hanging essentially horizontally. Moreover, there will be a good space for the hand of the milker above the connections to grip the teat cup at its upper part and apply it onto the teat of the cow. Another advantage is that the moment on the teat depending on a certain pulling force in the tubes is reduced due to the fact that the connection between the tubes and the teat cups is closer to the teat than in known teat cups.

When describing the embodiments according to FIGS. 6–10 we have stated that it is advantageous if the connections between the tubes and the teat cups are made in that way that the teat cup will hang essentially horizontally. That means that the connection between the tubes and the teat cup could be somewhat below the centre of gravity without leaving the basic idea of the invention, which is that the teat cups shall be so designed and shall be arranged in the described way close to the cow, so that each teat cup can be applied onto the teat of the animal by a simple grip of one hand of the milker.

What is claimed is:

1. In an apparatus for milking an animal having an udder with downwardly extending teats, said apparatus including a plurality of teat cups to be applied to the teats and which, when so applied, are adapted to deliver milk while being pulsated, the improvement comprising flexible members connected to the respective teat cups, and means for suspending each teat cup by its flexible member in position to be applied to a teat and while said teat cup hangs freely, independently of the other teat cups, from a level located above the animal's teats.

2. The improvement of claim 1, in which each said flexible member is constituted by a part of milk and vacuum tubes for conducting milk from and pulsating, respectively, the corresponding teat cup.

3. The improvement of claim 1, in which each said flexible member is constituted by part of a vacuum tube for pulsating the corresponding teat cup.

4. The improvement of claim 1, in which said suspending means includes an element for mechanically collecting said flexible members to hold them together at said level.

5. The improvement of claim 4, in which said collecting element is adjustable vertically to vary said level.

6. The improvement of claim 1, in which said flexible members are wires.

7. In an apparatus for milking an animal having an udder with downwardly extending teats, which apparatus includes a plurality of teat cups to be applied to the teats, a milk tube connected to each teat cup for conducting milk therefrom, a vacuum tube connected to each teat cup and adapted for connection to a source of pulsating vacuum to create a pulsating vacuum within the teat cup, and means for supporting the teat cups, the improvement in which said supporting means comprises a flexible member connected to each teat cup, and means for suspending each teat cup by its flexible member in position to be supplied to a teat cup and while said teat cup hangs freely, independently of the other teat cups, from a level located above the animal's teats.

8. The improvement of claim 7, in which each said flexible member is constituted by part of said milk and vacuum tubes connected with the corresponding teat cup.

9. The improvement of claim 7, in which each said flexible member is constituted by part of said vacuum tube connected to the corresponding teat cup.

* * * * *

UNITED STATES PATENT AND TRADEMARK OFFICE
CERTIFICATE OF CORRECTION

PATENT NO. : 4,735,172
DATED : April 5, 1988
INVENTOR(S) : LENNART WAHLSTROM et al.

It is certified that error appears in the above-identified patent and that said Letters Patent are hereby corrected as shown below:

Col. 1, line 58, after "introduction" insert--in which--.

Col. 6, line 43, change "supplied" to--applied--.

Signed and Sealed this

Seventh Day of March, 1989

*Attest:*

DONALD J. QUIGG

*Attesting Officer*  *Commissioner of Patents and Trademarks*